A. W. McKOWN.
AUXILIARY SPRING FOR WAGONS.
No. 186,263. Patented Jan. 16, 1877.
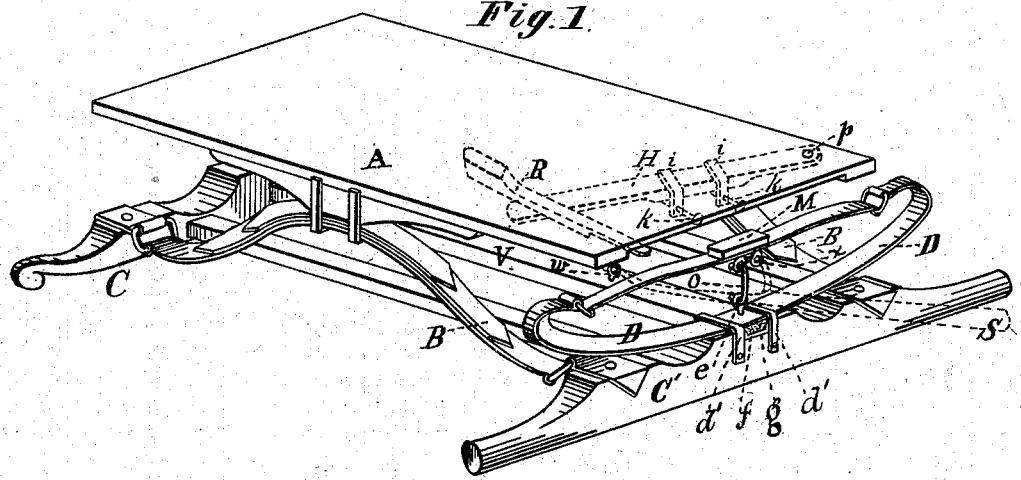
Witnesses
Pennington Halsted
W. R. Edelen
Inventor
A. W. McKown

UNITED STATES PATENT OFFICE.

ALEXANDER W. McKOWN, OF HONESDALE, PENNSYLVANIA.

IMPROVEMENT IN AUXILIARY SPRINGS FOR WAGONS.

Specification forming part of Letters Patent No. 186,263, dated January 16, 1877; application filed October 25, 1876.

*To all whom it may concern:*

Be it known that I, ALEXANDER W. MCKOWN, of Honesdale, in the county of Wayne and State of Pennsylvania, have invented certain new and useful Improvements in Springs for Vehicles; and I do hereby declare that the following is a full, clear, and exact description thereof, which will enable others skilled in the art to which it appertains to make and use the same, reference being had to the accompanying drawings, and to the letters of reference marked thereon, which form a part of this specification.

Figure 1 is a perspective view of a wagon-body containing my invention; Fig. 2, a rear elevation; Figs. 3, 4, 5, and 6, detail views.

My present invention relates to that class of springs in which auxiliary springs employed to re-enforce the main springs may at will be brought into action or placed entirely out of action, as circumstances may require, such as, for instance, the weight of the load, the character of the road, &c.

The invention consists, primarily, in combining, with the auxiliary spring, (or springs, if more than one be used,) a rubber-packed eyebolt and a link, the eyebolts and link serving to hold the spring out of action when not brought into use, and the rubber preventing the jarring of the eyebolts or of the hook, and the jolting and rattling of metal against metal, and the consequent damage and fracture of the eyebolt.

It further consists in combining, with the auxiliary spring, novel devices whereby it is locked to place when brought into action; in mechanism whereby these locking devices may be readily swung to a position out of a vertical line above the spring when the spring is not in use, and whereby, also, they may be readily swung and held to such vertical position when it is desired to connect them with the spring; and in other details hereinafter stated.

A represents the frame or body of a vehicle; B B, the main springs, which may be of any ordinary construction, and extending from front to rear of the vehicle, at its sides; C, the bolster, and C' the rear axle. D is the auxiliary spring, which is shown applied to the rear axle only; but it may, if desired, be applied both to the axle and the bolster. It is secured to its axle by means of straps or clamps $d'$ and an eyebolt, $e$, the lower end of which is riveted to a metallic piece or plate, $f$, and above this plate is a rubber packing, $g$, the bolt $e$ being so applied as to allow a slight vertical play during the movements of the carriage and spring, and the rubber acting both as an elastic cushion, and also as a separator of the iron or metal of the spring from the metal of other adjacent movable parts, thus preventing any dead concussion of metal against metal, such concussions, especially in driving fast over rough roads when the spring is hooked down, as hereinafter stated, and as shown in Fig. 1, causing it to vibrate, and tending to break the hook or eyebolt. This tendency, however, it is found is effectually prevented by this rubber packing.

The devices for locking this spring to the body of the vehicle, in order to bring it into action to re-enforce the main springs, are as follows: To a bar, H, attached to the under side of the vehicle, as shown in detached view in Fig. 4, are affixed two metallic clamps or straps, $i\ i$, provided with holes $j\ j$, for fastening pins or bolts $k\ k$, and between these straps a cavity or recess, $l$, is made in the bar, adapted to receive the metal block M, attached to the top of the spring at its center. The top of cavity $l$ is faced with metal. When the spring is brought into service the block M is lodged in the recess $l$, and the bolts $k\ k$ are, respectively, inserted in the holes $j$, and the spring is now ready to perform its duty as an auxiliary and re-enforcing spring. The withdrawal of the bolts or pins $k\ k$ will again disconnect the spring, and throw it completely out of action until again wanted. But in order to prevent any injury to the spring when thus set free at its top, either from its swaying or from its unrestrained expansion or contraction while the vehicle is running, I fasten it down as follows: N is an eye or eyebolt at the center of the spring, directly over the eyebolt $e$, and O is a metal link or yoke, the prongs of which, being inserted, one in each of the eyes N and $e$, hold the whole steadily down to place, and far from the box or body of the vehicle, the rubber packing $g$ now coming into service, and positively preventing all rattling and risk of breaking the bolt $e$, as previously stated.

In order to preclude all possiblity of contact of the straps $i\ i$, or of the bar H, with the auxiliary spring or its block M when the spring is thus fastened down, however heavy may be the load, or however rough the road, I arrange the bar so that it may be turned or swung to one side until again needed. For this purpose it is pivoted at $p$, and its other end is free to be moved in a guide-rail, $q$, to a distance sufficient to carry the straps and bar out of range, so that under no conditions can they touch the spring. When the spring is again to be brought into action the bar H is moved back to its place, a spring-latch, R, detains it there, the yoke O releases the spring from its confinement, and the block M is again secured to its place in the bar.

The bar H, instead of swinging, may be arranged to be moved or slid forward or backward.

As the auxiliary spring requires some strength or power to pull and fasten it down, I have devised the following efficient means: S is an improvement in the nature of a lever, having a curve, $t$, at one end, and a hook, $u$, midway, the other end serving as a handle. To the bar or reach V, which connects the axle and bolster, is secured an eye, $w$, adapted to receive the tip or curve $t$ of this implement, and the hook $u$ is at the same time inserted in the eye $x$ on the upper leaf of the spring. The lever being then pulled down, the eyes N and $e$ are then brought near enough together to lock them with the yoke O. The tool S is then removed.

The double fastenings of the block M by the two bolts or pins $k\ k$ prevent undue side movement of the carriage box or body when the spring is locked to its place for use.

I claim—

1. In combination with an auxiliary spring of a wagon or vehicle, the rubber-packed eye-bolt and the eye or hook N, these eyes being adapted to receive the link or yoke O, substantially as and for the purpose set forth.

2. The combination, with the auxiliary spring, of the block M, the cross-bar having cavity $l$, straps $i\ i$, and pins or bolts $k\ k$, substantially as and for the purpose set forth.

3. The pivoted bar H, provided with devices for locking the spring, as set forth, and arranged to be swung out of operative position and free from the spring, and to be swung into operative position for connection with the spring, substantially as and for the purpose described.

4. In combination with the auxiliary spring and with its eye $x$, the eye $w$, these eyes being adapted to receive the spring-compressing tool preparatory to locking the spring out of action.

In testimony that I claim the foregoing as my invention I affix my signature in presence of two witnesses.

ALEXANDER W. McKOWN.

Witnesses:
P. McNICKLE,
PENNINGTON HALSTED.